United States Patent [19]

Prinz et al.

[11] Patent Number: 4,532,810

[45] Date of Patent: Aug. 6, 1985

[54] DEVICE FOR THE PICK-UP OF MEASURED VALUES

[75] Inventors: A. F. Rudolf Prinz; Rudolf M. Charvat, both of Brunswick, Fed. Rep. of Germany

[73] Assignee: Deutsche Forschungs- und Versuchsanstalt fur Luft- und Raumfahrt e.V., Cologne, Fed. Rep. of Germany

[21] Appl. No.: 510,360

[22] Filed: Jul. 1, 1983

[30] Foreign Application Priority Data

Jul. 2, 1982 [DE] Fed. Rep. of Germany ....... 3224757

[51] Int. Cl.$^3$ .............. G01B 5/00; G01B 7/14; G01D 5/20; G01L 9/00

[52] U.S. Cl. .................... 73/717; 33/143 L; 33/147 D; 33/147 H; 33/148 D; 33/148 H; 73/432 A; 73/DIG. 3; 324/208; 338/32 H

[58] Field of Search .............. 338/32 R, 32 H, 42; 73/DIG. 3, 717, 719, 722, 725, 728, 432 A; 33/147 D, 147 N, 143 L, 148 D, 148 H; 324/207, 208

[56] References Cited

U.S. PATENT DOCUMENTS

| | | | |
|---|---|---|---|
| 2,907,897 | 10/1959 | Sander | 73/723 |
| 2,987,669 | 6/1961 | Kallmann | 73/DIG. 3 |
| 3,025,461 | 3/1962 | Snellen | 338/32 R |
| 3,162,804 | 12/1964 | Parsons | 324/208 |
| 3,187,254 | 6/1965 | Wasserman | 73/DIG. 3 |
| 3,575,054 | 4/1971 | Glista | 73/DIG. 3 |
| 3,818,326 | 6/1974 | Masuda | 338/32 R |
| 4,359,685 | 11/1982 | Eguchi | 324/208 |

OTHER PUBLICATIONS

Applications of Hall Effect and Magnetoresistance Aerovox Research Worker, printed by Aerovox Corp., 1966.

*Primary Examiner*—S. Clement Swisher
*Attorney, Agent, or Firm*—Gottlieb, Rackman & Reisman

[57] ABSTRACT

A device for the pick-up of measured values having a frame forming a first measurement reference and an element movable relatively to the frame and forming a second measurement reference. The device includes a carrier connected to the element forming the second measurement reference and a mechanical/electrical conversion system connected between the frame and the carrier. The conversion system produces a magnetic field directed at right angles to the direction of movement of the carrier and has at least one air gap within which the carrier is arranged to move at right angles to the magnetic field. Two pairs of field plates are arranged in the air gap and when the carrier is moved the extent of penetration of the pairs of the field plates by the magnetic field is changed. The device also includes a bridge circuit by which the field plates are connected. The bridge circuit includes in one diagonal thereof a device for the display of measured values and is connected across the other diagonal thereof to a d.c. voltage.

20 Claims, 15 Drawing Figures

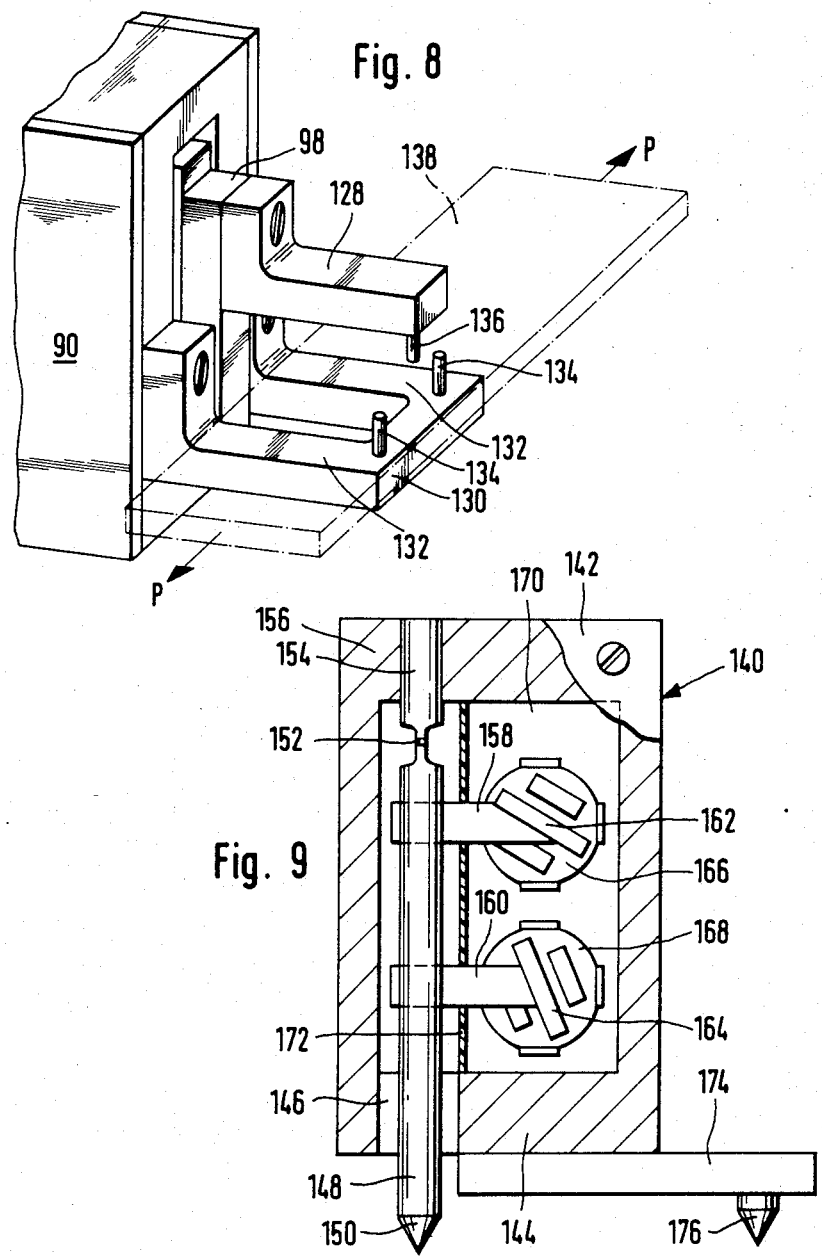

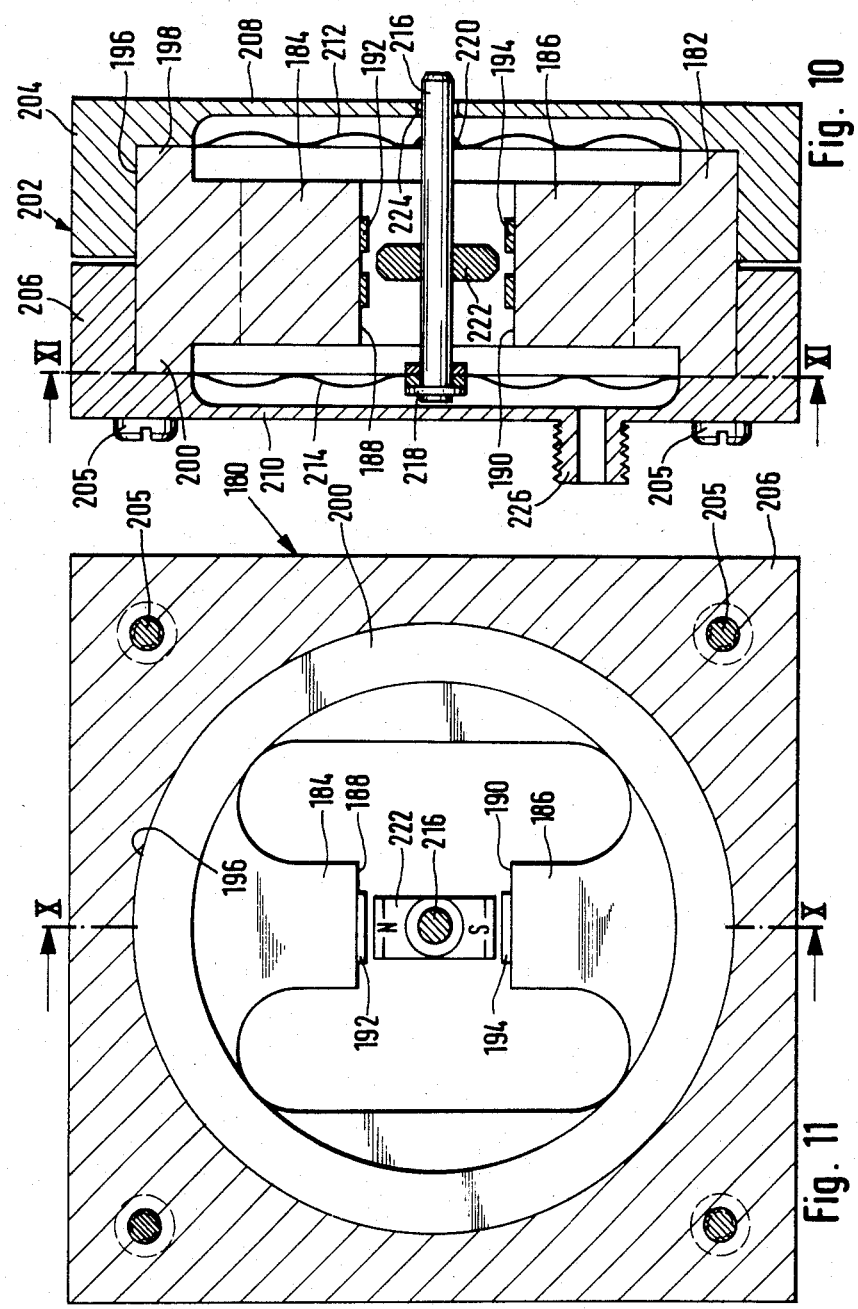

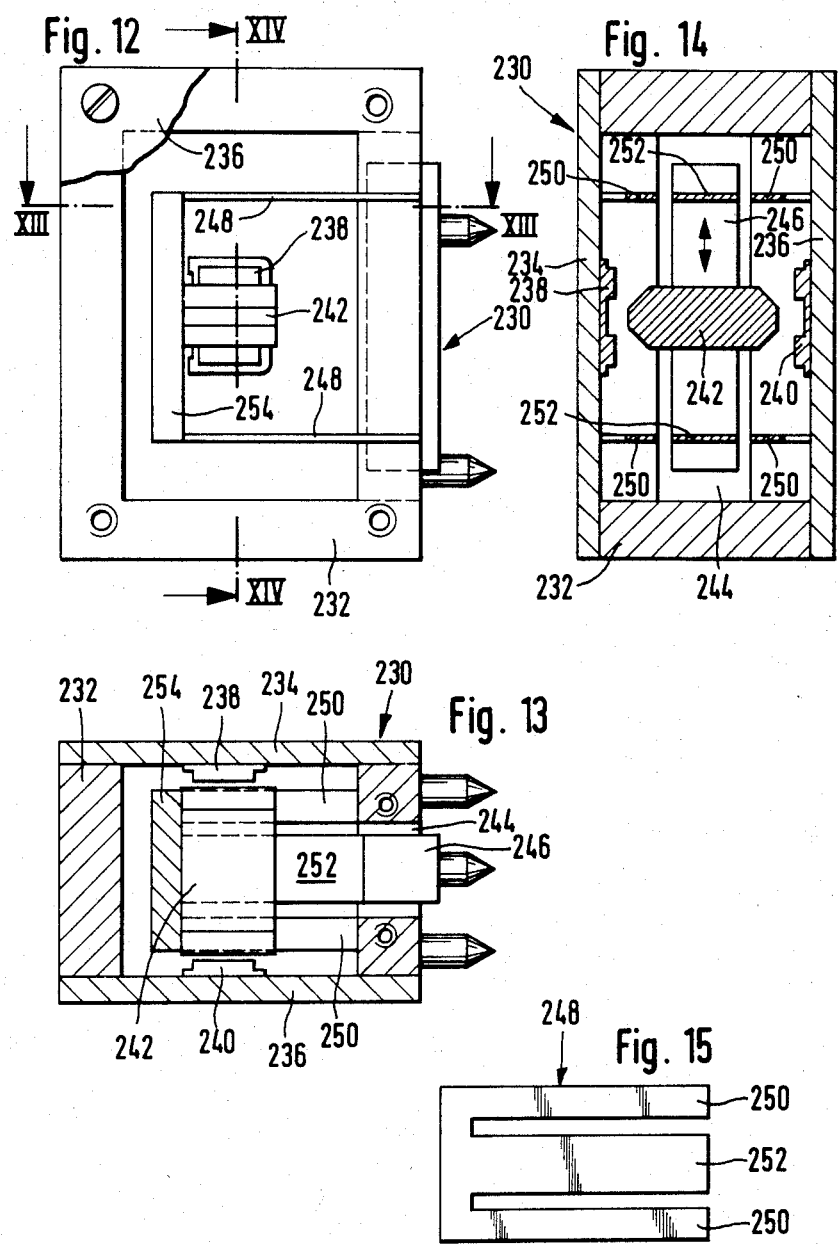

DEVICE FOR THE PICK-UP OF MEASURED VALUES

FIELD OF THE INVENTION

The invention relates to a device for the pick-up of measured values of the type having a frame forming a first measurement reference; an element movable relatively to said frame and forming a second measurement reference; a carrier connected to said element forming said second measurement reference and a mechanical-/electrical conversion system having a first means which is attached to said frame and a second means which is attached to said carrier.

DESCRIPTION OF THE PRIOR ART

In a known device for the pick-up of measured values which is intended for the measurement of shear deformation of layers of adhesive material (DE-OS No. 24 35 068) an inductive displacement pick-up is arranged between components which are movable relative to one another. Such an inductive displacement pick-up requires the use of expensive amplification devices. In addition, a pick-up device of this type has a relatively large installation volume due to the use of induction coils.

Field plate devices for the pick-up of measured values are also known (Siemens-Bauteile-Information 6 (1968) 5, pages 172–177, Siemens-Bauteile Report, 17 (1979) 2). The field plate is a semi-conductor constructional element of which the resistance increases steeply in a magnetic field. For the measurement of small displacements it is known, in this case, to cause the field plate to dip more or less deeply into a homogeneous or an inhomogeneous magnetic field or to arrange for the field plate to be fixed in a homogeneous magnetic field and to vary the magnetic field by means of a magnetic armature. It is also known, here, to connect the field plate to the armature. In this case double field plates are also known which can be used as contact-free switches in series or parallel circuits.

It is an object of the invention to devise a device for the pick-up of measured values of this nature by means of which it is possible to measure displacements in the $\mu$-region with high resolution, without temperature effect and with a small outlay of instrument technology.

SUMMARY OF THE INVENTION

This object is solved according to the invention by providing in a device for the pick-up of measured values of the type having a frame forming a first measurement reference; a carrier connected to said element forming said second measurement reference and a mechanical-/electrical conversion system having a first means which is attached to said frame and a second means which is attached to said carrier, means producing a magnetic field directed at right angles to the direction of movement of said carrier having at least one air gap therein in which said carrier is arranged to move at right angles to the magnetic field produced; two pairs of field plates arranged in said air gap, each pair of said field plates spaced apart from one another in the direction of movement of said carrier and arranged opposite each other with respect to their poles; means by which, when said carrier is moved, the extent of penetration of the pairs of said field plates by the magnetic field is changed, and a bridge circuit by which said field plates are connected, said bridge circuit including a device for the display of measured values connected in one diagonal thereof and means for connecting a d.c. voltage across the other diagonal of said bridge circuit.

Convenient embodiments of the device according to the invention are described hereinafter.

DESCRIPTION OF THE PREFERRED EMBODIMENT

The invention is illustrated in the drawings by way of example and is described in detail in the following with reference to the accompanying drawings, in which:

FIGS. 6, 7 and 8 show additional embodiments of the primary elements and the primary element adapters;

FIG. 9 shows another embodiment of the device for the pick-up of measured values;

FIG. 10 is a section along line X—X through another embodiment;

FIG. 11 is a section along line XI—XI in FIG. 10;

FIG. 12 is a lateral view of another embodiment;

FIG. 13 is a section along line XIII—XIII in FIG. 12;

FIG. 14 is a section along line XIV—XIV in FIG. 12;

FIG. 15 is a plan view on a leaf spring as used with the embodiment according to FIG. 12.

Figure 1:
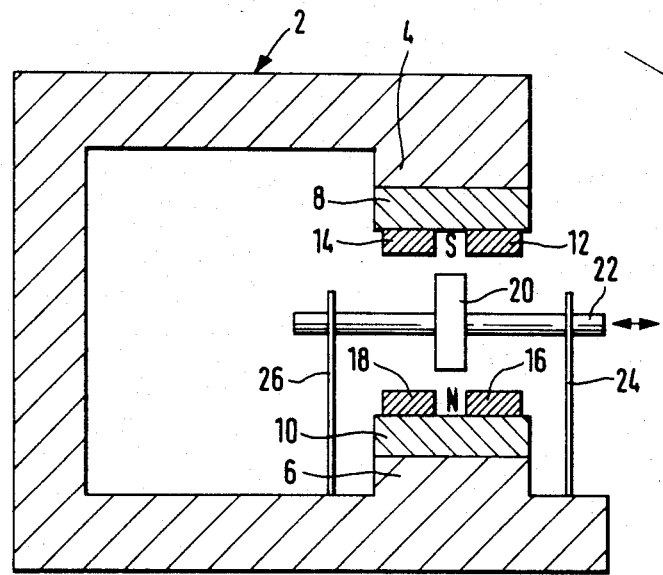
FIG. 1 shows schematically, in principle, the construction and the operation of a device for the pick-up of measured values according to the invention in the form of an embodiment having permanent magnets.
Figure 1:
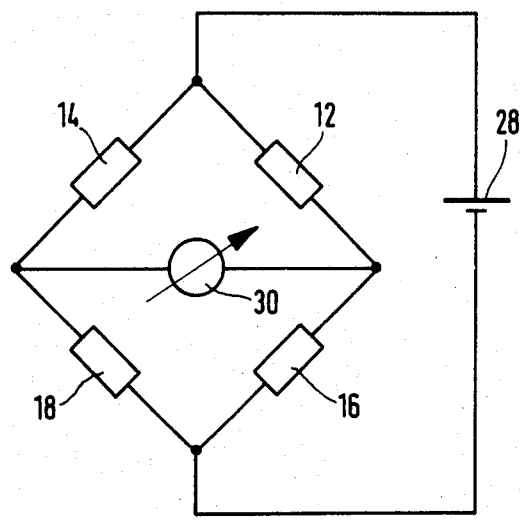

The device for the pick-up of measured values illustrated schematically in FIG. 1 has a frame 2 in the form of a C.

Permanent magnets 8, 10 are fixed on the two sides of the limbs 4 and 6 of the frame which face one another, the permanent magnets being parallel to one another and, in particular, of opposite polarities. On the free surface of the permanent magnets 8 and 10 there are mounted, in each case, two field plates adjacent one another, in particular the field plates 12 and 14 on the permanent magnet 8 and the field plates 16 and 18 on the permanent magnet 10. An armature 20, made from a magnetically conducting material, is arranged in the free space between the two field plates, in particular on a movable carrier 22, which can be moved in the direction of the double arrow by means of two leaf springs 24 and 26 spaced apart from one another. The leaf springs are stretched in the frame 2 and are connected firmly to the carrier 22. The four field plates, each of which has two electrical contacts, not illustrated in the drawing, are, as shown in the lower part of FIG. 1, connected to form a bridge circuit and provided with a source of voltage 28 to supply the bridge. The change in resistance of the field plates may be displayed by the instrument 30, registered by a recording instrument or stored and worked up after AD-transformation. Temperature compensation is achieved at the same time by means of the bridge circuit.

The two pairs 12, 14 and 16, 18 of field plates may be commercial differential field plate sensors. In order to achieve a greater range of measurement it may be convenient to arrange the field plate sensors at a greater distance from one another than is the case for commercial differential field plate sensors.

The magnetic lines of flux in the air gap between the oppositely situated magnetic poles are concentrated by means of the armature 20. The degree of concentration depends on the thickness of the armature. When the armature 20 is moved the magnetic flux through the two pairs of field plates changes. The bridge is thereby correspondingly unbalanced and a corresponding reading is displayed by the instrument or display unit 30. It has been found in practice that with a simple bridge circuit and a conveniently stabilised supply voltage of 5 V d.c. and with a measurement range of 0.2 mm for the device for the pick-up of measured values, high resolution is achieved within the measurement range. With a device for the pick-up of measured values of the form described hereinafter with reference to FIGS. 4 and 5, using the field plate differential sensor FP 111 L 100 of the firm Siemens AG, Munich, the following values were achieved:

Range of measurement ±0.2 mm
Supply voltage of the bridge 5 V d.c. stabilised
Internal resistance 225Ω
Supply current 25 mA
Voltage in the bridge diagonal for the range of measurement ±0.2 mm±300 mV.

It is possible thereby to connect the primary element directly into a control system through a simple adjusting pre-amplifier. In addition, the device for the pick-up of measured values has the advantage that it can be manufactured with very small dimensions. This will be discussed further with reference to FIGS. 4 and 5.

Figure 2:
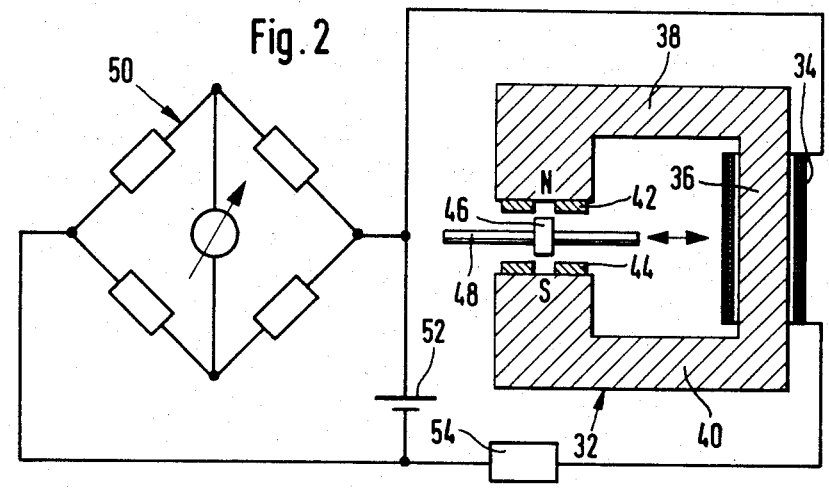
FIG. 2 shows schematically an embodiment having an electromagnet.

In the embodiment according to FIG. 2, the frame 32 illustrated here, is again C-shaped and is designed as the core of an electromagnet, of which the winding 34 is mounted on the limb 36 of the frame. At the free ends of the limbs 38, 40 on the parallel end faces which face one another and which form the north and south poles there are mounted two pairs 42, 44 of field plates in a manner similar to that in the embodiment according to FIG. 1. In the free space between the pairs of field plates an armature 46 is mounted on a carrier 48 capable of movement in the direction of the double arrow. Once again the carrier can, in a similar manner, be guided in the axial direction by means of leaf springs. The field plates of the two pairs 42 and 44 of field plates are connected to form a bridge circuit 50. In this case the source of voltage 52 also serves as the supply voltage for the electromagnet 34. Owing to the connection of the pairs 42 and 44 of field plates in the bridge circuit a temperature compensation is achieved as in the embodiment according to FIG. 1. In addition, it is possible to provide a control 54 for the coil current of the electromagnet with a NTC- or a PTC-resistance, in order to compensate temperature-dependent changes in the sensitivity of the field plates.

Figure 3:
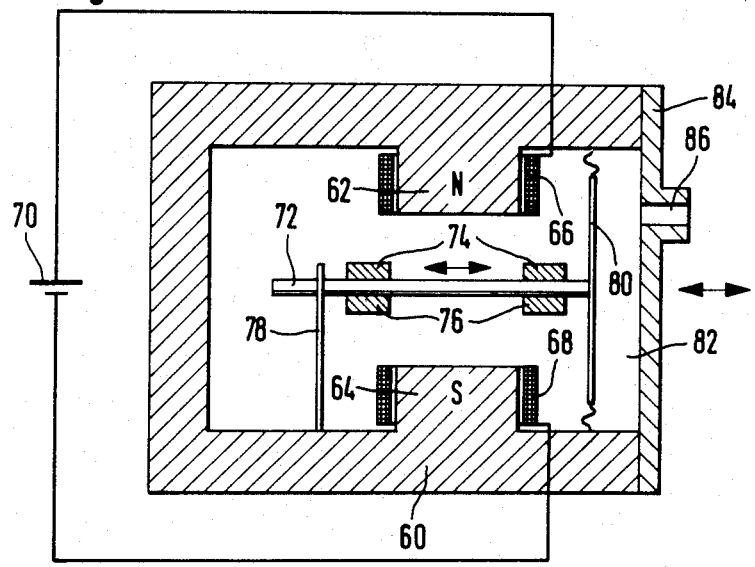
FIG. 3 shows schematically another embodiment of the device for the pick-up of measured values with electromagnets on the housing.

FIG. 3 shows another embodiment of a device for the pick-up of measured values according to the invention. The frame 60 here has two pole projections 62, 64 directed towards one another, around which there is arranged, in each case, an exciting coil 66, 68, the two coils being connected in series to a voltage source 70. The current flow through the coils 66 and 68 is such that the two pole arms have opposite polarity. Between the magnetic poles formed in this way a movable carrier 72 can be displaced in the direction of the double arrow. Field plates 74, 76 are arranged at a distance from one another on the carrier 72. The pairs of field plates are movable relatively to the fixed magnetic field. The distances between the field plates should be sufficiently large that even the smallest movement of the carrier 72 leads to changes in the magnetic flux through the field plates and thus to changes in their resistance. The carrier 72 is again guided at its left hand end by means of a leaf spring 78, while it is firmly attached at its right hand end to a membrane spring 80. This membrane 80 forms one wall of a chamber 82 which is closed on the opposite side to the membrane 80 by a fixed plate 84 in which there is arranged a connection socket 86. It is possible by means of this arrangement to measure the pressure of gases or liquids with high accuracy. The carrier 72 could also be guided at each end by means of leaf springs as in the two embodiments according to FIGS. 1 and 2.

The pairs of field plates 74 and 76 in the embodiment of FIG. 3 are connected to form a bridge circuit in a manner similar to that of the embodiment according to FIGS. 1 and 2. It is also possible for a temperature compensation to be produced as in the embodiment according to FIG. 2.

Figure 4:
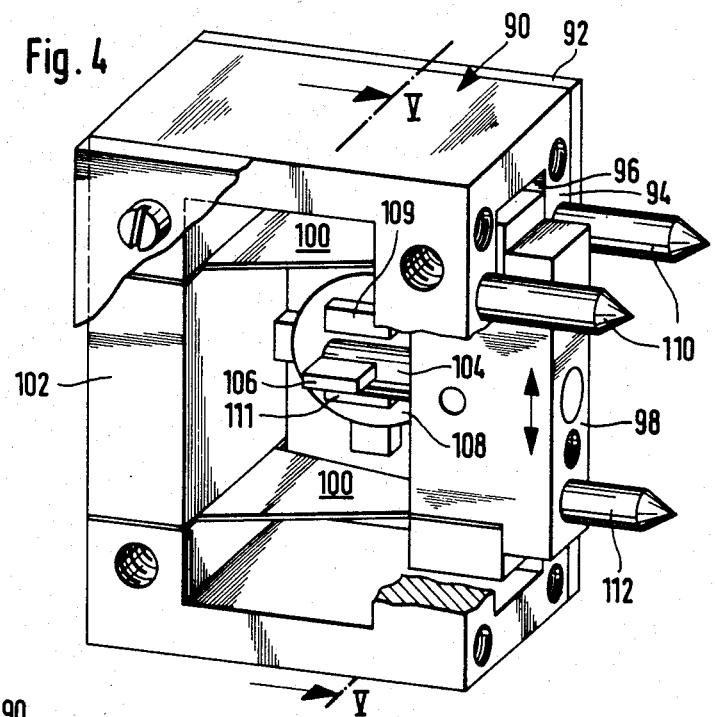
FIG. 4 shows an embodiment of a device for the pick-up of measured values according to the invention having a first arrangement of the primary elements.
Figure 5:
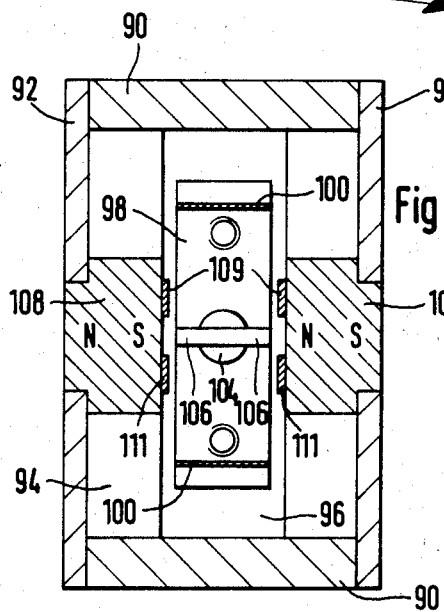
FIG. 5 is a section along line V—V in FIG. 4.

A convenient embodiment is illustrated in FIGS. 4 and 5. The frame 90 is here designed as a closed quadilateral which is, in addition covered at the sides by plates 92, of which only the rear plate is shown in FIG. 4. The front plate is indicated by one corner portion only. A window 96 in which a carrier 98 is movably mounted is formed in the arm 94 of the frame 90. The carrier is guided by two leaf springs 100 which are mounted, by means of their ends which face away from the carrier 98, in the rear arm 102 of the frame 90 by clamping.

A carrying arm 104 which extends in the interior of the frame 90 is connected rigidly to the carrier 98. An armature of a magnetically-conducting material which extends ar right angles to the direction of movement of the carrier 98—shown by the double arrow—is attached to the carrier 98. A permanent magnet 108 is mounted on the inner side of the end plates 92. In particular, the magnets 108 are mounted in such a way that the magnets have opposite polarities on their facing ends. Each of the permanent magnets 108 has mounted thereon a pair of field plates 109 and 111 situated at a distance from one another and having their longitudinal axes extending in the direction of the longitudinal extension of the armature and thus at right angles to the direction of movement of the carrier 98.

On the external side of the arm 94 of the frame 90 and the front side of the carrier 98 there are attachment devices for measuring points or measuring adaptors. Preferably threaded bores are provided for this purpose into which measuring points can be screwed or by means of which measuring adaptors can be attached. In the embodiment of FIG. 4 two measuring points 110 are arranged next to one another on the arm 94, while a measuring point 112 is attached at a distance from them on the front side of the carrier 98. The measuring points have threads at their inner ends, not illustrated in the drawing, by means of which they can be screwed into the threaded bores.

A primary element, as it is illustrated in FIGS. 4 and 5, can be manufactured with very small dimensions, for example having a housing breadth of 11 mm, a housing height of 20 mm and a housing depth of 16 mm, and thus a total volume of 3.5 cm$^3$ and a weight of approximately 20 g.

Figure 6:
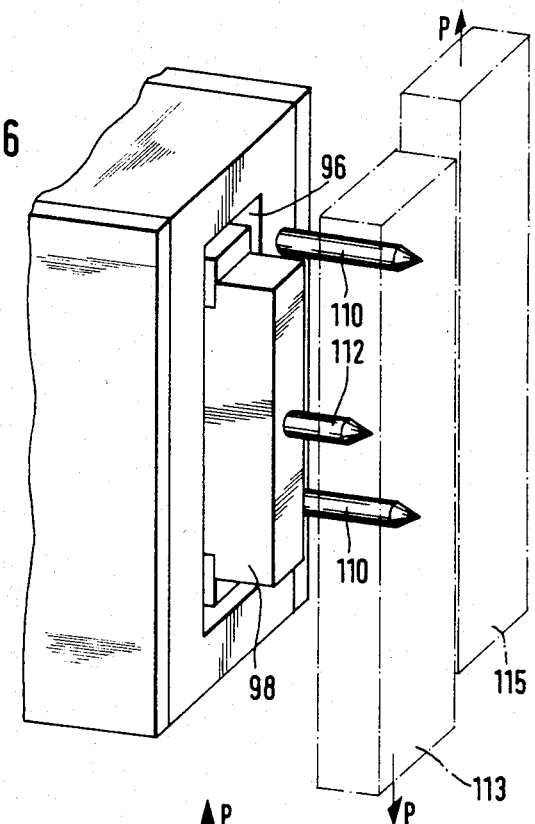

In the embodiment according to FIG. 6, in which the same reference numbers as in FIGS. 4 and 5 are given to similar components, fixed measuring points 110 are arranged on the frame 90 at one side of the window 96, while the measuring point 112 is arranged at the centre of the carrier 98. In this way a relatively narrow measuring base is achieved, by means of which it is possible, for example, to measure shear displacements between two workpieces 113 and 115 attached to one another by means of an adhesive. Here the two measuring points 110 engage the component 115 while the measuring point 112 engages the component 113.

Figure 7:
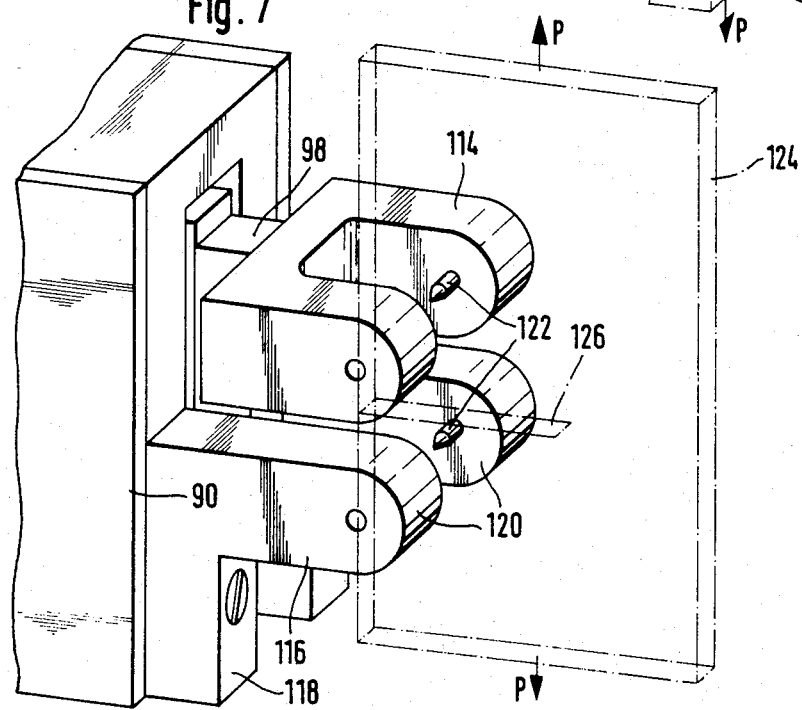

FIG. 7 shows the device for the pick-up of measured values with measuring adaptors for carrying out measurements of the opening of cracks. Here a U-shaped prong 114, with a gap extending in the direction of movement of the carrier 98, is connected to the carrier 98. Angle-shaped elements 116 are attached to the frame 90, in particular by means of an arm 118 which is screwed to the frame. The arm 120 projecting at right angles from the arm 118 is aligned with the arms of the prong 114. Two screws 122 are arranged, one in each of the arms of the prong 114 and are each provided with a point on its inner end. By means of these attachment screws the workpiece 124 is connected rigidly on each side of a crack 126, on the one hand with the movable prong 114 and on the other hand with the fixed arms 120 of the elements 116.

The device according to the invention shown in FIG. 8 has measuring adaptors by means of which the transverse expansion of a test piece can be measured. Here an angle-shaped adaptor 128 is attached rigidly on the carrier 98 while a frame 130, the arm 132 of which extends parallel to a projecting arm of the adaptor 128, is firmly screwed to the frame 90. Application pins 134 are arranged at the ends of the measuring adaptor on the arm 132 and the application pin 136 is mounted on the arm 128 of the adaptor. In order to carry out a measurement, these pins 134, 136 are held in contact with the opposite sides of a workpiece 138, for example by means of an applied clamp or like device.

By means of the device for the pick-up of measured values as described in the various embodiments shown by way of example non-electrical measured quantities are determined, after transformation into a change of displacement, very accurately, without significant expenditure on the measuring amplifier and with a very low mass of the device for the pick-up of measured values itself. Owing to the special arrangement of the field plates, the measurement results are also unaffected by inexact guidance of the movable parts and, because of the full bridge circuit connection, a high sensitivity of measurement is achieved with, at the same time, a very low variation with temperature.

In the embodiment according to FIG. 9, a close frame 110 is again provided which is closed at the sides by plates, of which the front plate 142 is indicated in FIG. 9. The lower arm 144 of the frame, as illustrated in the drawing, is provided with an opening 146 through which the movable carrier 148 engages, said carrier being provided at its external end with a measuring point 150.

The carrier 148 is clamped rigidly by means of its other end 154 in the upper arm 156 of the frame. Below the clamping position there is provided a swivelling joint 152 about which the carrier 148 can pivot. On the carrier 148 there is provided at a distance from one another two carriers for armatures 158, 160 which act by means of a transversely situated armature 162, 164 in conjunction with differential pairs of field plates 166, 168 which are attached in a similar way to the field plate pairs 109, 111 of the embodiment according to FIGS. 4 and 5. The drawing shows the differential field plates which are attached to the plate 170 situated at the rear.

Since the carrier 14 carries out a pivoting movement, it is convenient to arrange the armature 162, 164 radially with respect to the swivelling joint 152 and the differential field plates 166, 168 correspondingly in such a way that the field plates are situated parallel to the armatures. In this way the non-linearity due to the movement of the armature through an arc is to a large extent compensated. This compensation is also simplified in that devices for the pick-up of measured values of the type described are generally intended for very small ranges of measurement which normally lie below one millimeter.

By means of the arrangement of two armatures with associated pairs of field plates a possibility is produced of using the device for the pick-up of measured values for different ranges of measurement and, in particular, by the use of differential field plates with equal plate separation. Obviously it would also be possible to design the embodiment according to FIG. 9 with a single armature which can be arranged at any desired position through the length of the carrier 148.

In the embodiment of FIG. 9 it is possible in a simple manner to protect the field plates from dirt. For this purpose an elastic separating wall 172 can be provided in the internal space of the frame 140 through which the carriers for the armatures are led.

Since it is possible to construct devices for the pick-up of measured values according to FIG. 9 with particularly small frame dimensions there may arise a problem of having a sufficient length available for a measurement base line. For this purpose it is possible, as is shown in the drawing, to attach a plate 174, which carries the measuring point 176, fixed relative to the frame, at its end, on to the lower arm 144 of the frame. This plate 174 may at the same time be designed in such a way that the device for pick-up of measured values can be rigidly clamped to the object to be measured. It is also possible to arrange the measuring point 176 to be fixed directly on the frame. In the same way, the arm 144 of the frame could be extended outwards directly above the frame 140.

A further miniaturisation of the dimensions of the device for pick-up of measured values can be achieved by arranging on the carrier, instead of an armature made from a magnetically-conducting material, a permanent magnet which provides the magnetic field which changes the resistance of the field plates when the carrier is moved. In this case, as in the embodiment according to FIG. 1, the C-shaped frame forms a body which acts as a magnetic short circuit. However, the permanent magnets 8 and 10 mounted on the arms of the C-shaped frame in the embodiment according to FIG. 1 would be absent. The permanent magnet is here conveniently designed to be wedge-shaped at its two poles at right angles to the direction of movement. In this way it is possible to achieve the necessary mass of the magnet with the necessary concentration of the lines of flux at the poles.

In the embodiment according to FIGS. 4 and 5, the magnet 108 would be absent in such a case. The pairs 109, 111 of field plates could then be mounted directly on the plates 92 whereby it is possible to reduce the breadth of the frame 90, as may readily be seen on examining FIG. 5.

Another convenient embodiment of a device for the pick-up of measured values with the use of a permanent magnet on the movable carrier is illustrated in FIGS. 10 and 11. The device 180 for pick-up of measured values in this embodiment has an annular body 182, of a magnetically conducting material, which forms the magnetic short circuit and which is provided internally with two oppositely-situated poles 184, 186 having parallel pole faces 188, 190 opposite to one another on which there are arranged, in each case, pairs 192, 194 of field plates in such a way that the field plates are situated in the axial direction of the body 182 at a distance from one another. The short circuit body 182 is, in this embodiment, provided with a cylindrical circumferential surface 196 and is designed in the region of its circumference with axially-directed annular projections 198, 200. The short circuit body 182 is situated in a two-part outer housing 202, which has a cylindrical recess corresponding to the dimensions of the short circuit body in the region of its circumference, inclusive of the projections 198, 200. In the example of the embodiment illustrated, the two parts 204, 206 of the housing are provided with walls 208, 210 radially inward of the projections 198, 200. The parts of the housing can be joined together and stressed against the short circuit body by means of screws 205.

Between the projections 198, 200 and the corresponding parts 204, 206 of the housing, there are springs 212, 214 in the form of stretched membranes. A carrier 206 in the form of a rod is fixed centrally in these membrane springs, where on the left the connection between the membrane 214 and the carrier 216 is shown as a screw or clamp connection 218 and on the right the connection between the membrane spring 212 and the carrier is shown as a soldered or welded joint 220.

A permanent magnet is arranged on the carrier 216 and is situated with its north or south pole facing towards the field plate pairs 192 or 194. In the pole region the magnet 222 is designed to be wedge-shaped so that a relatively narrow pole surface is formed. In this manner, a concentration of lines of flux within the field breadth required at the time is produced at the poles of the magnet.

The carrier 216 is guided outwards on the right hand side through a bore 224 in the wall 208 of the housing. In a similar way, the wall 210 of the housing may be provided with a bore through which the carrier 214 could project outwards. The housing 202 of the device 180 for pick-up of measured values forms the first measurement reference where, if necessary, measuring points or the like may be mounted on the housing. The second measurement reference acts directly or indirectly on the carrier 216. In this manner, as in the other embodiments, the transverse movement of the magnets and thus of the carrier at right angles to the pairs 192, 194 of field plates is measured.

In FIG. 10, the housing part 206 is provided to the left of the wall 210 with a connection piece 226 for a fluid which can be introduced through this connection into the sealing closed space between the wall 210 and the membrane 214. It is possible in this way to carry out measurements of pressure with the device for pick-up of measured values and, in particular, in both the high pressure and the low pressure range. In this case it is not necessary to bring the carrier 216 out through the wall 208. However, there may conveniently be provided in this wall an opening for the equalisation of pressure. In the embodiment for the measurement of pressure the carrier 216 may also be fixed at one side to the membrane 214 and the membrane 212 may be absent. With a device for the pick-up of measured values having an annular body as in the embodiment according to FIGS. 10 and 11, the armature may also consist of a magnetically-conducting material where permanent magnets are then provided on the pole surfaces, as in the embodiment according to FIG. 1.

The embodiment according to FIGS. 12 to 15 corresponds in principle in its construction to the embodiments of FIGS. 4 and 5. The device for pick-up of measured values 230 here has a quadilateral frame 232 which is closed on both sides by plates 234, 236. Pairs 238, 240 of field plates are arranged on these plates. the permanent magnet 242 which is here again represented with its poles sloped in the form of wedges, is situated between these pairs of field plates.

In one of its arms, the frame has a window 244 in which a carrier 246 is mounted to be movable in the direction of the double arrow illustrated. As in the embodiment according to FIGS. 4 and 5, the carrier 246 can be guided by two leaf springs which are fixed in the arm of the frame opposite the window 244. In the embodiment according to FIGS. 12 to 15 leaf springs of a different form 248 are provided, as to be noted from FIG. 15 these are designed in the form having two outer tongues 250 and a central tongue 252. These springs 248 are each stretched by means of the ends of their outer tongues 250 in the arm of the frame in which the window 244 is formed. The rod which connects the three tongues 250, 252 is connected to a carrying element 254 which is here designed in the form of a plate and which carries the magnet 242 at its centre. The central tongue 252 is connected at its free end to the carrier 246. The effective length of the spring is doubled by means of such a design of leaf spring. This leads to a reduction in the path covered by the magnet 242 in relation to the effective length of the tongues 250 or 252, for example, a decrease in the ratio 1:2. The range of measurement is increased correspondingly in this way.

In order to decrease the hysteresis, especially in the embodiments, by means of permanent magnets, below the field plates is preferably arranged a thin layer of a soft magnetic material. For said layer a thickness of about 0.2–0.5 mm would be sufficient.

What we claim as our invention and desire to secure by Letters Patent of the United States is:

1. A device for the pickup of measured values having a frame as carrier for a first measurement reference, a carrier for a second measurement reference being movably mounted relative to said frame.
   a mechanical to electrical conversion system provided at said frame, having a first element attached to said frame and a second element attached to said movably mounted carrier, including
   two pairs of field plates, the field plates of each pair being located at a distance parallel to each other, said two pairs of field plates being arranged oppositely to each other on opposite parallel pole surfaces in the frame so that an air gap is present between said oppositely arranged two pairs of field plates;
   magnetic means, the magnetic field of which is present at the pairs of said field plates and said air gap,
   an armature connected to said carrier for a second measurement reference and being movable transversely with respect to said parallel pole surfaces in said air gap between said two pairs of field plates and in the general direction in which the field plates of each pair of field plates are separated and in the area between the field plates of each of said two pairs of field plates, whereby said armature causes the magnetic flux through the field plates to be varied depending on the position of said first and second measurement references relative to each other, a bridge circuit having the field plates as elements, adapted to be connected to display and/or recording means for measured values of one diagonal of said bridge circuit, while voltage is applied to the other diagonal.

2. A device for the pick-up of measured values according to claim 1, in which said poles are magnetic poles.

3. A device for the pick-up of measured values according to claim 2, in which the means producing a magnetic field is permanent magnets arranged on said poles.

4. A device for the pick-up of measured values according to claim 2, in which the pairs of said field plates are arranged on the pole faces of said magnetic poles and an armature of a magnetically-conducting material is arranged on said carrier.

5. A device for the pick-up of measured values according to claim 1, in which a permanent magnet is arranged on said carrier at right angles to the direction of movement of said carrier and the pairs of said field plates are arranged opposite to the poles of the permanent magnet on parts of said frame forming a magnetic short circuit.

6. A device for the pick-up of measured values according to claim 1, in which said carrier is guided by two leaf springs spaced apart from one another.

7. A device for the pick-up of measured values according to claim 1, in which said carrier is guided by at least one membrane spring.

8. A device for the pick-up of measured values according to claim 7, in which said membrane spring is a movable wall of a chamber which can be loaded with a fluid.

9. A device for the pick-up of measured values according to claim 7, in which said carrier is attached with one end to said membrane spring and is carried by said spring.

10. A device for the pick-up of measured values according to claim 1, in which said carrier is suspended at one side thereof for pivoting and carries said second measurement reference at its free end.

11. A device for the pick-up of measured values according to claim 10, in which a plurality of armatures is arranged on said carrier at varying distances from the point of pivoting, each of which said armatures acts in conjunction with a separate pair of said field plates.

12. A device for the pick-up of measured values according to claim 10, in which a plurality of permanent magnets is arranged on said carrier at varying distances from the point of pivoting, each of which magnets acts in conjunction with a separate pair of said field plates.

13. A device for the pick-up of measured values according to claim 1, in which said frame is annular, said poles projecting from the internal circumference of said frame and said carrier is movably mounted in the axial direction of said frame.

14. A device for the pick-up of measured values according to claim 1, in which said frame is of quadilateral shape and the open sides of said frame are covered by plates on the inner side of which the pairs of said field plates are arranged opposite one another, said frame having in one arm thereof a window in which said carrier is guided parallel to said arm of the frame and two parallel leaf-springs for guiding said carrier, the device also including, on the side of said carrier which faces inwards said means by which the penetration of the magnetic field through the pairs of said field plates is changed when said carrier moves.

15. A device for the pick-up of measured values according to claim 1 in which said frame and said carrier have threaded bores therein for the attachment of threaded ends of measurement sensors.

16. A device for the pick-up of measured values according to claim 15, in which said measurement sensors comprise measuring points screwed into said threaded bores.

17. A device for the pick-up of measured values according to claim 15, in which measurement adaptors extend at right angles to the direction of movement of said carrier, said measurement sensors mounted on respective measurement adaptors to extend one after the other in the direction of movement of said carrier.

18. A device for the pick-up of measured values according to claim 15, on which there are attached, on said carrier and on said frame, measurement sensor supports in the form of forks having workpiece accepting slots extending in the direction of movement and on arms thereof which extend, in each case, at right angles to the direction of movement of said carrier screw means by which attachment to the workpiece to be tested can be effected.

19. A device for the pick-up of measured values according to claim 18, in which said screw means arranged in the arms of said carrier are provided with measurement sensor points which make contact with the workpiece.

20. A device for the pick-up of measured values according to claim 1, in which a thin layer of a soft magnetic material is located between said field plates and said pole surface.

* * * * *